US009986292B2

(12) United States Patent
Roberts et al.

(10) Patent No.: US 9,986,292 B2
(45) Date of Patent: *May 29, 2018

(54) METHOD AND APPARATUS FOR PRESENTING MEDIA PROGRAMS

(71) Applicant: AT&T INTELLECTUAL PROPERTY I, LP, Atlanta, GA (US)

(72) Inventors: Linda Roberts, Boynton Beach, FL (US); E-Lee Chang, Mableton, GA (US); Ja-Young Sung, San Jose, CA (US); Natasha Barrett Schultz, Suwanee, GA (US); Robert Arthur King, Roswell, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/168,549

(22) Filed: May 31, 2016

(65) Prior Publication Data

US 2016/0277801 A1 Sep. 22, 2016

Related U.S. Application Data

(63) Continuation of application No. 14/316,903, filed on Jun. 27, 2014, now Pat. No. 9,380,349, which is a
(Continued)

(51) Int. Cl.
*G06F 3/00* (2006.01)
*H04N 21/4722* (2011.01)
(Continued)

(52) U.S. Cl.
CPC ..... *H04N 21/4722* (2013.01); *H04N 7/17318* (2013.01); *H04N 21/435* (2013.01);
(Continued)

(58) Field of Classification Search
CPC ............ H04N 21/4622; H04N 21/472; H04N 21/4788; H04N 21/482
See application file for complete search history.

(56) References Cited

U.S. PATENT DOCUMENTS 5,223,924 A 6/1993 Strubbe
5,920,694 A 7/1999 Carleton
(Continued)

OTHER PUBLICATIONS

Chorianopoulos, "Content-Enriched Communication—Supporting the Social Uses of TV", 10-page article, the Journal of the Communications Network, vol. 6, Part 1, Jan.-Mar. 2007, 10 pages.
(Continued)

*Primary Examiner* — Gigi L Dubasky
(74) *Attorney, Agent, or Firm* — Guntin & Gust, PLC; Atanu Das

(57) ABSTRACT

A system that incorporates teachings of the present disclosure may include, for example, a computing device, including a controller to: transmit a client program having a graphical user interface to a media device operating in an interactive television network, wherein the client program presents a symbolic overlay that superimposes onto media content received by the media device and enables the media device to associate commentary with the media content received at the media device; and conduct searches for one of consumer products or consumer services associated with the media content based on the commentary regarding the media content. Other embodiments are disclosed.

20 Claims, 8 Drawing Sheets

Related U.S. Application Data continuation of application No. 12/623,099, filed on Nov. 20, 2009, now Pat. No. 8,839,306.

(51) Int. Cl.
| | | |
|---|---|---|
| *H04N 7/173* | (2011.01) | |
| *H04N 21/435* | (2011.01) | |
| *H04N 21/443* | (2011.01) | |
| *H04N 21/4788* | (2011.01) | |
| *H04N 21/61* | (2011.01) | |
| *H04N 21/81* | (2011.01) | |

(52) U.S. Cl.
CPC ..... *H04N 21/4438* (2013.01); *H04N 21/4788* (2013.01); *H04N 21/6125* (2013.01); *H04N 21/6175* (2013.01); *H04N 21/812* (2013.01); *H04N 21/8173* (2013.01)

(56) References Cited

U.S. PATENT DOCUMENTS

| | | |
|---|---|---|
| 6,272,231 B1 | 8/2001 | Maurer |
| 6,357,042 B2 | 3/2002 | Srinivasan |
| 6,438,579 B1 | 8/2002 | Hosken |
| 6,567,797 B1 | 5/2003 | Schuetze |
| 6,580,811 B2 | 6/2003 | Maurer |
| 6,732,146 B1 | 5/2004 | Miyake |
| 6,792,412 B1 | 9/2004 | Sullivan |
| 6,948,131 B1 | 9/2005 | Neven |
| 7,028,050 B1 | 4/2006 | Rose et al. |
| 7,031,931 B1 | 4/2006 | Meyers |
| 7,051,352 B1 | 5/2006 | Schaffer |
| 7,716,376 B1 | 5/2010 | Price |
| 8,612,306 B1 | 12/2013 | Mukherjee et al. |
| 8,839,306 B2 | 9/2014 | King et al. |
| 2002/0010759 A1 | 1/2002 | Hitson |
| 2002/0059094 A1 | 5/2002 | Hosea |
| 2002/0097265 A1 | 7/2002 | Kurapati |
| 2002/0162107 A1 | 10/2002 | Gutta |
| 2002/0178057 A1 | 11/2002 | Bertram |
| 2002/0193066 A1 | 12/2002 | Connelly |
| 2002/0194586 A1 | 12/2002 | Gutta |
| 2002/0199194 A1 | 12/2002 | Ali |
| 2003/0066068 A1 | 4/2003 | Gutta |
| 2003/0101450 A1 | 5/2003 | Davidsson |
| 2003/0234805 A1 | 12/2003 | Toyama |
| 2004/0003392 A1 | 1/2004 | Trajkovic |
| 2004/0064526 A1 | 4/2004 | Lee |
| 2005/0144632 A1 | 6/2005 | Mears |
| 2005/0149974 A1 | 7/2005 | Norman |
| 2006/0020614 A1 | 1/2006 | Kolawa |
| 2006/0026502 A1 | 2/2006 | Dutta |
| 2006/0168150 A1 | 7/2006 | Naik |
| 2006/0190966 A1 | 8/2006 | McKissick |
| 2006/0218481 A1 | 9/2006 | Adams, Jr. |
| 2006/0259355 A1 | 11/2006 | Farouki |
| 2006/0271997 A1 | 11/2006 | Jacoby |
| 2006/0288041 A1 | 12/2006 | Plastina |
| 2007/0011039 A1 | 1/2007 | Oddo |
| 2007/0174244 A1* | 7/2007 | Jones ............... G06F 17/3053 |
| 2009/0063995 A1 | 3/2009 | Baron et al. |
| 2009/0235298 A1* | 9/2009 | Carlberg ........... H04N 5/44543 725/24 |
| 2009/0249223 A1* | 10/2009 | Barsook ............. H04N 7/15 715/753 |

OTHER PUBLICATIONS

Coppens, "AmigoTV: Towards a Social TV Experience", Alcatel Bell R&I Residential Networked Applications, 4-page article, Apr. 1, 2004.

Georgia Tech, "Avatar Theater—Experimental TV Lab at Georgia Lab", 2-page article, http://etv.gatech.edu/ projects/avatar-theater/, web site last visited Jan. 20, 2010.

Khadraoui, "Interactive TV Show Based on Avatars", IEEE: Systems Communications, 2005, Proceedings, Aug. 17, 2005, pp. 192-197.

Luyten, "Telebuddies: Social Stitching with Interactive Television", Hasselt University—Transnationale Universiteit Limburg, Belgium, 6-page article, CHI 2006, Apr. 22-27, 2006.

Mukesh, Nathan et al., "CollaboraTV: Making Television Viewing Social Again", Oct. 22, 2008, 15.

Oehlberg, "Designing for Distributed, Sociable Television Viewing", Stanford University, Mechanical Engineering, Palo Alto Research Center, 10-page article, May 2006.

Weisz, "Watching Together: Integrating Text Chat with Video", Carnegie Mellon University/University of Minnesota, 10-page article, CHI 2007, Apr. 28-May 3, 2007.

www.youtube.com, "Netflix Party on XBox Live", 3-page article, http://www.youtube.com/watch?v= FuPxEC8Tfc&feature=related, web site last visited Jan. 20, 2010.

www.youtube.com "NXE Dashboard, Aug. 11 Update Preview Program—Netflix Party", 2-page article, http://www.youtube.com/watch?v=2brb-gCt2ss, web site last visited Jan. 20, 2010.

* cited by examiner

500

600

700

METHOD AND APPARATUS FOR PRESENTING MEDIA PROGRAMS

CROSS-REFERENCE TO RELATED APPLICATIONS

This application is a continuation of U.S. patent application Ser. No. 14/316,903, filed Jun. 27, 2014 by Roberts et al., entitled "Method and Apparatus for Presenting Media Programs", which is a continuation of U.S. patent application Ser. No. 12/623,099, filed Nov. 20, 2009 (now U.S. Pat. No. 8,839,306), which are incorporated by reference herein in their entireties.

FIELD OF THE DISCLOSURE

The present disclosure relates generally to media presentation techniques and, more specifically, to a method and apparatus for presenting media programs.

BACKGROUND

Consumers have a number of venues to access media content. For example, consumers can view video content supplied by social networking portals such as MySpace, FaceBook, and YouTube over an Internet browser. Similarly, consumers can view via a set-top box video content supplied by an Internet Protocol Television (IPTV) communication system, a satellite TV communication system, and/or a cable TV communication system. Other forms of media content such as audio content, pictures, articles, or combinations thereof can also be accessed by consumers over a public network such as the Internet.

Consumers can share with others their thoughts about media content they have consumed by word of mouth, text messaging (e.g., email), or other forms of common communication.

BRIEF DESCRIPTION OF THE DRAWINGS

FIG. 1 is a schematic illustration of an extranet architecture according to a preferred embodiment of the present invention.

DETAILED DESCRIPTION

The present disclosure is related to U.S. application Ser. No. 12/146,131, filed Jun. 25, 2008, by Amento et al., entitled "Method and Apparatus for Presenting Media Programs," which is incorporated by reference herein in its entirety.

One embodiment of the present disclosure can entail a method, including: presenting each of a plurality of users a media program; collecting one or more temporal actions including commentary initiated by the plurality of users while the media program is presented; creating one or more symbolic overlays corresponding to the one or more temporal actions of each user; combining the presentation of the media program with a presentation of the one or more symbolic overlays; and using the commentary initiated by the plurality of users in order to conduct searches for one of products or services associated with the media program.

Another embodiment of the present disclosure can entail a computer-readable storage medium, including a program for instructing a computer to: receive commentary while presenting media content; combine a presentation of the media content with a presentation of a symbolic overlay generated from the commentary; and use the commentary in order to conduct searches for one of products or services associated with the media content.

Yet another embodiment of the present disclosure can entail a computing device, including a controller to: transmit a client program having a graphical user interface (GUI) to a media device operating in an interactive television (iTV) network, wherein the client program presents a symbolic overlay that superimposes onto media content received by the media device and enables the media device to associate commentary with the media content received at the media device; and conduct searches for one of consumer products or consumer services associated with the media content based on the commentary regarding the media content.

Figure 1:
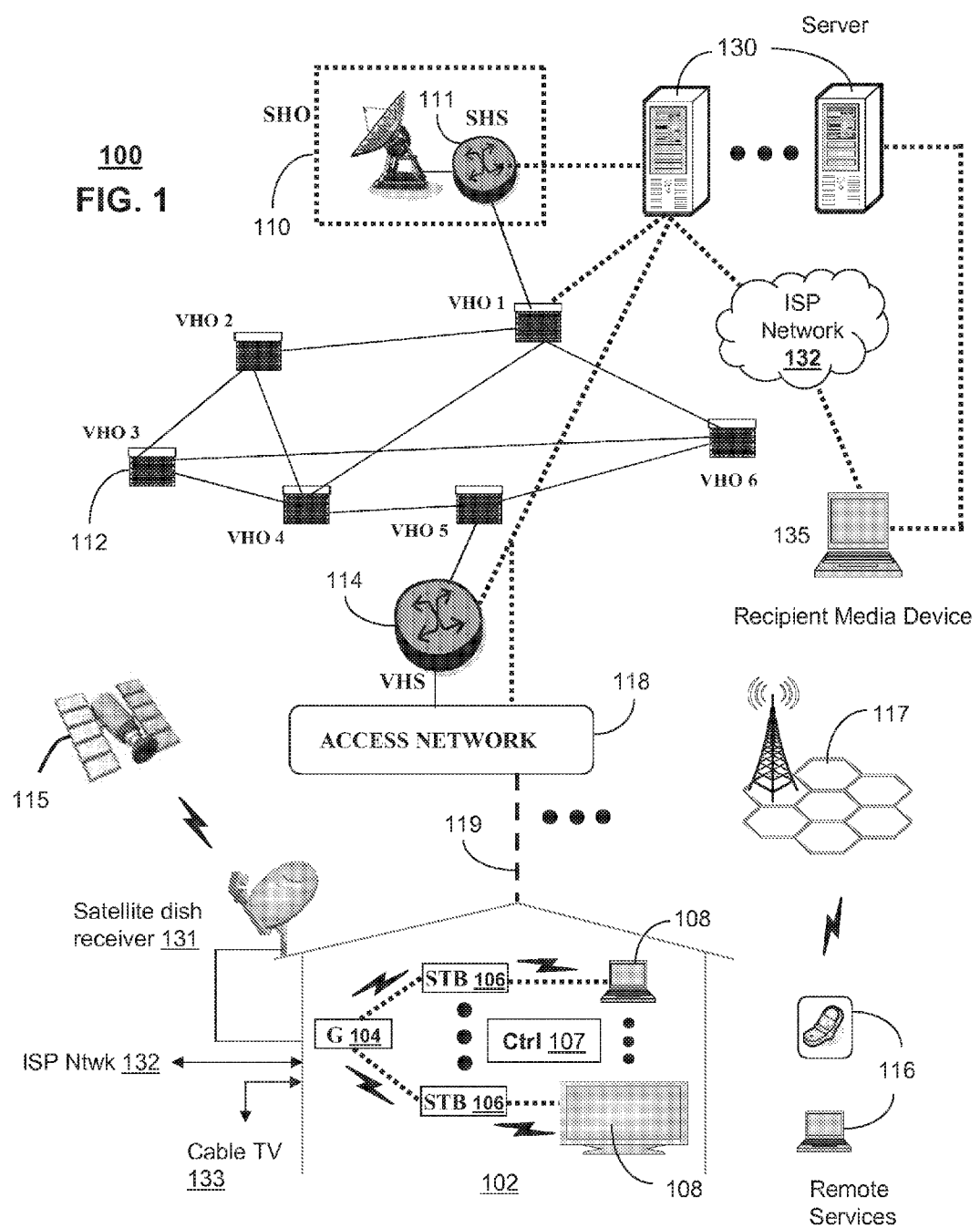
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

The first communication system 100 can also include a recipient media device 135. The recipient media device 135 can be communicatively linked to the ISP network 132, the one or more computing devices 130, and to other devices in the system 100. The recipient media device 135 can be a STB, mobile device, personal computer, telephone, personal digital assistant (PDA), or other device capable of receiving and transmitting media content. Furthermore, the recipient media device 135 can be configured to be operative in an iTV network, which can include, but is not limited to including, IPTV, interactive cable television, and interactive satellite television.

The recipient media device 135 can be configured to transmit requests for media content and commentary associated with the media content from devices in the system 100. The commentary can be user-generated and can be in a temporal vicinity of the associated media content. The media content and associated commentary can come from devices such as, but is not limited to, STBs 106, media devices 108, and wireless communications device 116. The media content and associated commentary can include video content, audio content, still image content, text content, and other media content. Additionally, the recipient media device 135 can be configured to receive and respond to requests from devices in the system 100 for media content and commentary associated with the media content. In responding to the requests from the devices, the recipient media device 135 can transmit media content and commentary associated with the recipient media device 135 to the requesting devices.

Another distinct portion of the computing devices 130 can function as a server (herein referred to as server 130). The server 130 can use common computing and communication technology to perform the function of receiving, transmitting, maintaining, processing, and storing various types of content. As mentioned above, such content can include video content, audio content, still image content, text content, and other content. The server 130 can maintain a client program, which can be downloaded and/or accessed by the devices in the system 100. The client program can be configured to present an overlay that can be superimposed onto the media content and can allow users of the devices in the system 100 to associate a comment with media content received at the devices.

Additionally, the server 130 can be configured to receive requests for the media content and commentary associated with the media content from the devices in the system 100, such as the recipient media device 135 and the STBs 106. Furthermore, the server 130 can relay and/or store the actual media content and/or the commentary associated with the media content, and/or relay links to the media content and/or commentary associated with the media content to the devices in the system 100 requesting the content and/or commentary.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
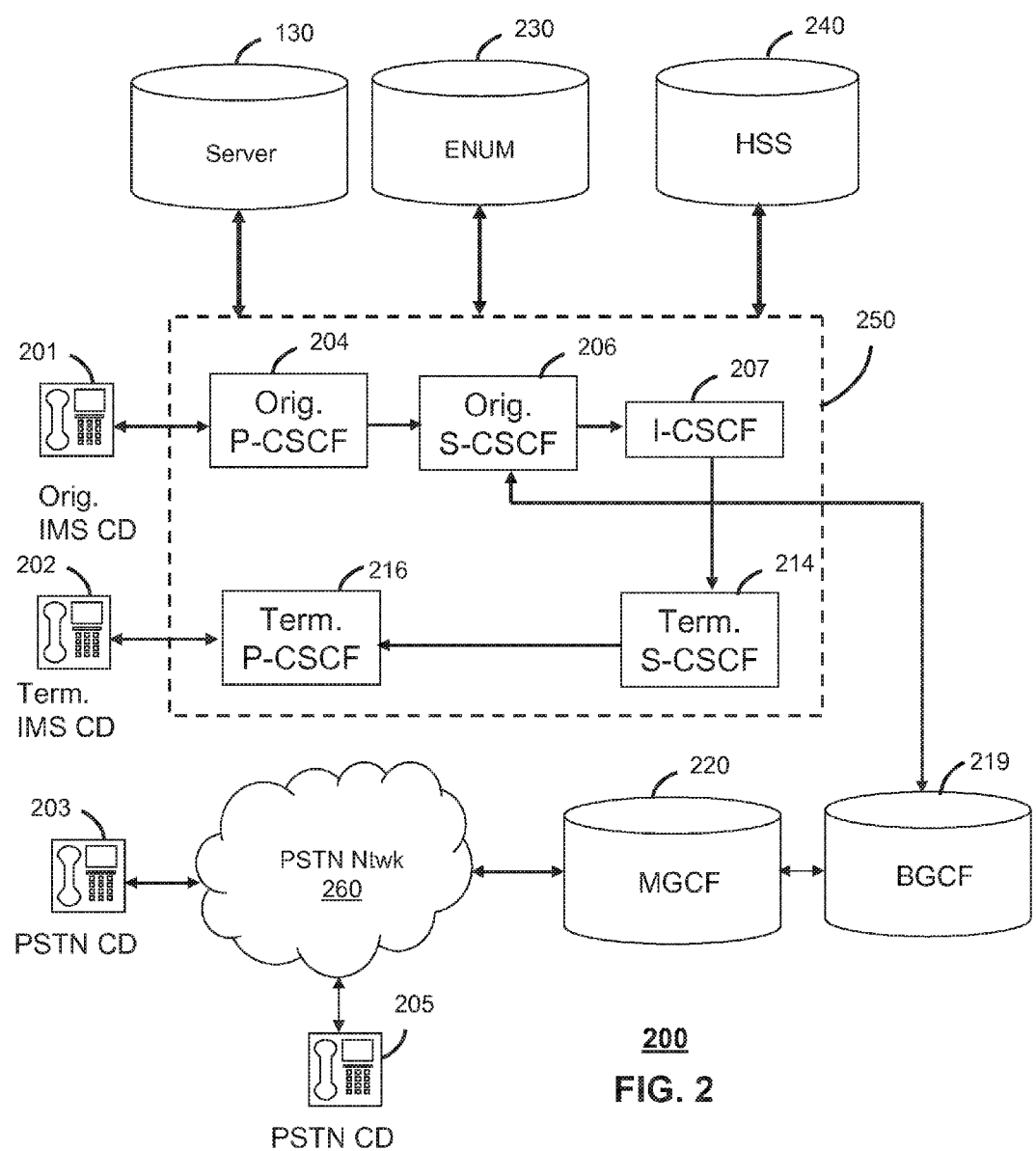

FIG. 2 depicts an illustrative embodiment of a communication system 200, employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E. 164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The server 130 of FIG. 1 can be operably coupled to the second communication system 200 for purposes similar to those described above.

Figure 3:
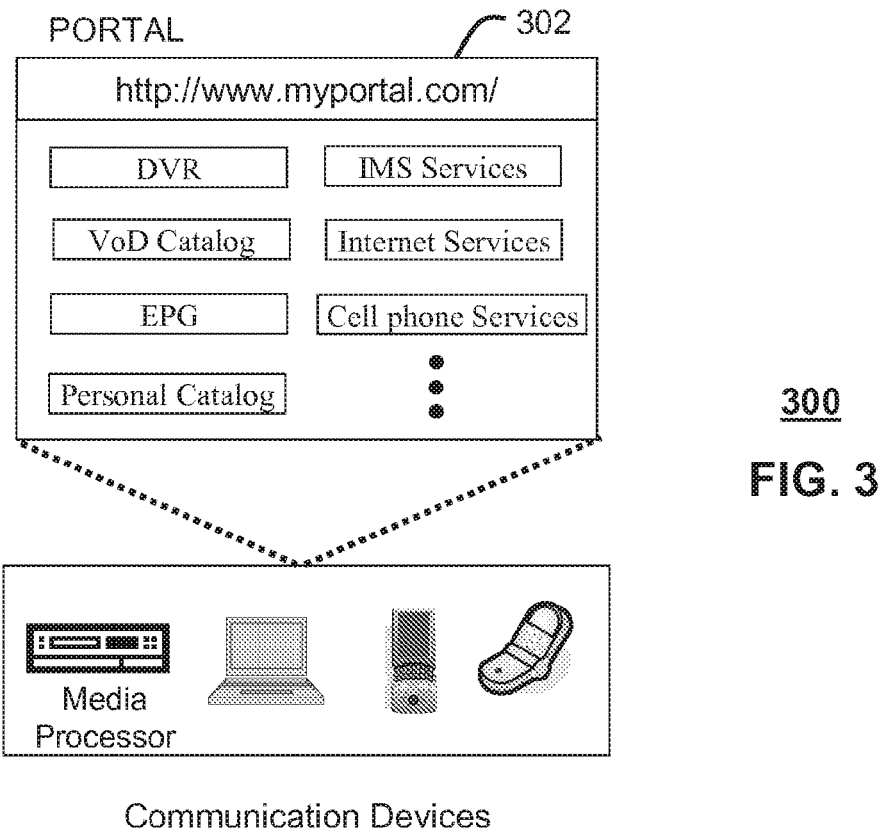
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
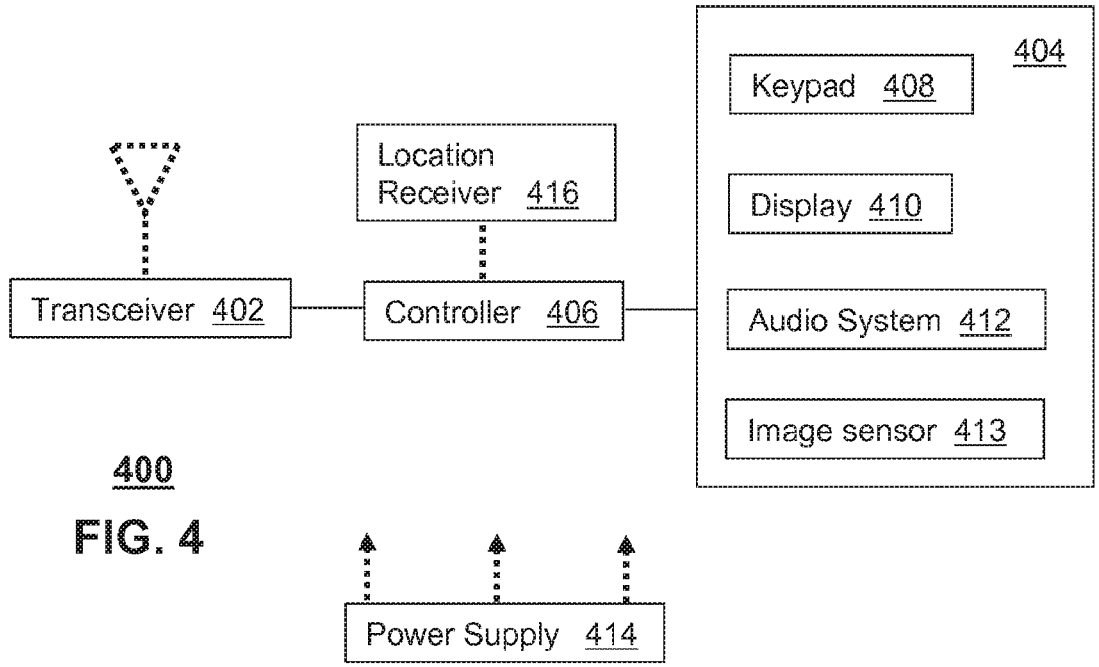
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1 X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
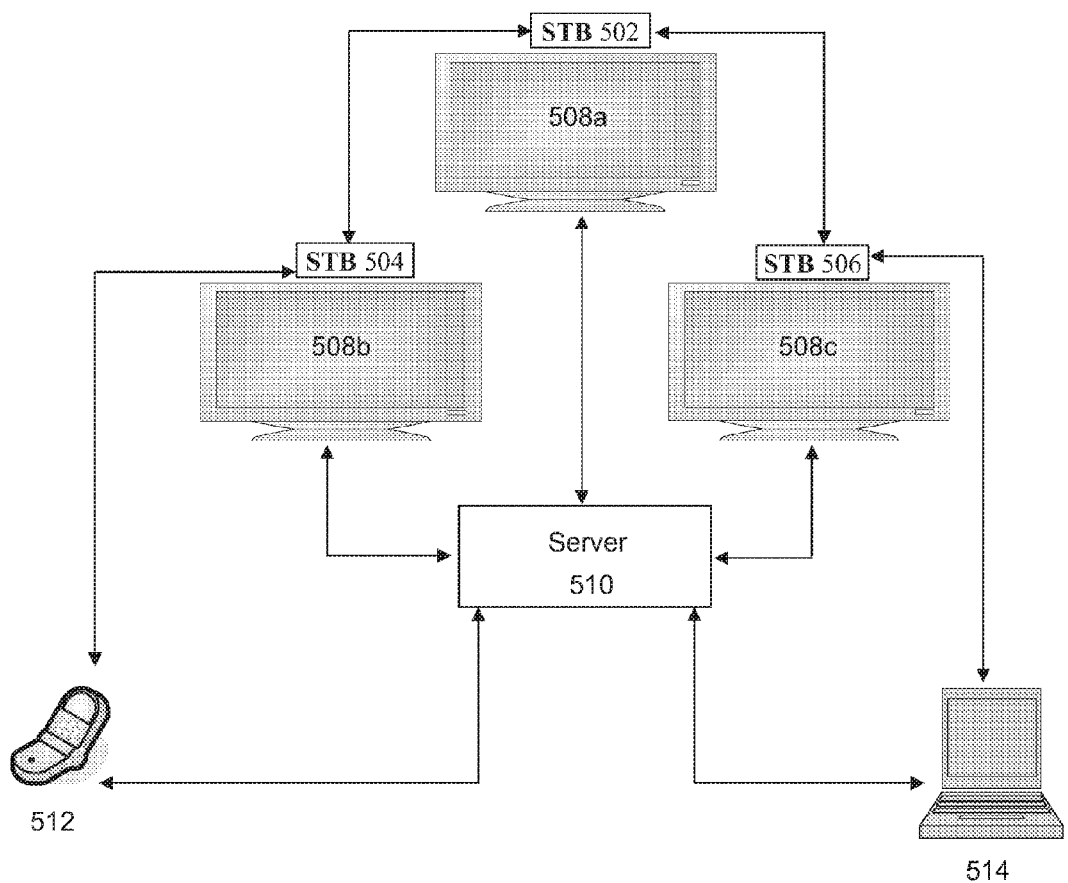
FIG. 5 depicts an illustrative embodiment of a system for transmitting media content, the system being operable in the communication systems of FIGS. 1-2.

FIG. 5 depicts an illustrative embodiment of a system 500 for transmitting media content, the system 500 being operable in portions of the communications systems of FIGS. 1-2. The system 500 can include one or more media devices 502, 504, and 506, which can be configured to deliver media content to display devices 508a-c and deliver and/or receive media content from server 510, communications device 512, and computing device 514. The media devices 502, 504, and 506 can be STBs or other similar media devices. The display devices 508a-c can include any device capable of displaying and/or playing media content such as televisions, cellular phones, personal digital assistants (PDA), computers, and the like. The server 510 can be a computing device including the operative features of server 130, among other features. The communications device 512 can include, for example, a mobile device, a cellular phone, wireless device, or other communications device and the computing device 514 can be a computer or laptop.

The server 510 can be utilized to communicatively link the media devices 502, 504, and 506 to the other devices of the system 500. The server 510 can be configured to receive, transmit, maintain, and store various types of media content. Additionally, the server 510 can include a client program, which can be accessed, downloaded, and/or otherwise utilized by the devices in the system 500. The client program can present an overlay that can be superimposed onto media content that is displayed and/or received at the devices in the system 500. Users of the client program can use the client program to associate commentary/comments with the media content accessed by the user.

Figure 6:
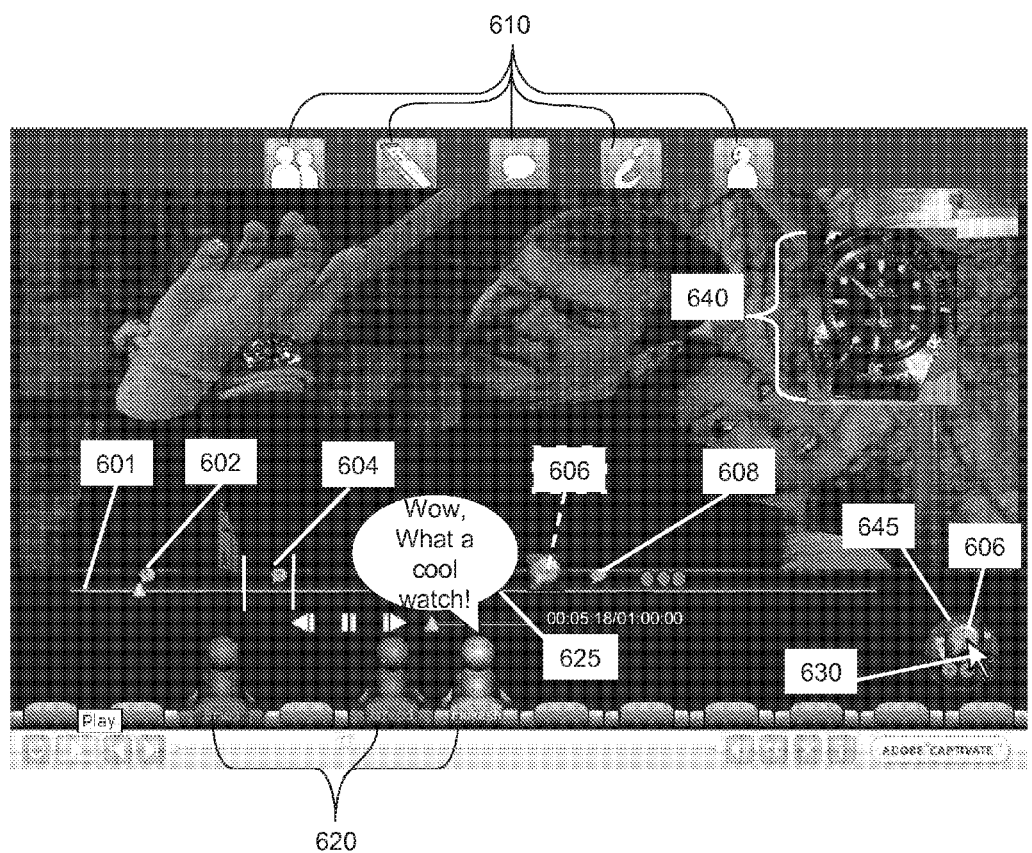
FIGS. 6 and 7 depict screenshots featuring a graphic user interface (GUI) in the form of an overlay illustrating commentary on a timeline associated with a media program.

FIG. 6 depicts a screenshot 600 illustrating an example of commentary on timeline. The screenshot 600 features a graphic user interface (GUI) in the form of an overlay generated by the client program. As will be discussed in more detail below, the overlay can include menu buttons 610, symbols such as iconic symbols including but not limited to avatars 620 and callouts 625, and other operative controls which are featured on the screenshot 600. The overlay can include a timeline 601, which can reflect the entire duration of a media program playing at a user's media device.

As the screenshot 600 illustrates, comments have been inserted at various points in the timeline 601 of the media program. The iconic symbols such as colored spheres in the screenshot 600 can indicate that a comment has been inserted at that particular point in the timeline 601 of the media program. For example, a single comment 602, a single comment 604, a single comment 606, and four comments 608 have been inserted into the timeline 601. In this example, the comment 606 is highlighted by being enlarged or changing color when, for example, a mouse pointer 630 is placed over the comment symbol and dragged to a shopping cart, as will be explained in more detail below. Once the user-generated comments are associated with their respective media content, the user can utilize the client program to transmit the media content, commentary/comments, and/or links to the content and commentary to the server 510. The server 510 can be configured to access, store, and maintain the media content, commentary, and/or links to the media content and commentary. Additionally, the server 510 can be configured to maintain information about the media content and commentary. If only the links to the media content are sent to the server 510, the server 510 can be configured to identify and extract the actual media content associated with the link. Similarly, if only the links to the commentary are sent to the server 510, the server 510 can be configured to extract the actual commentary associated with the link.

The server 510 and/or the other devices in the system 500 can be configured to receive requests for the commentary and/or the media content from recipient media devices, which can be the devices in the system 500. For example, media device 502 can transmit a request to server 510 for media content and commentary from communications device 512. When the server 510 receives a request from a recipient media device, the server 510 can transmit at least a portion of the actual media content and commentary and/or the links to the media content and commentary to the recipient media device. If only the links are sent to the recipient media device, the recipient media device can access the media content and/or commentary via the links.

The recipient media device can then be configured to present the media content and/or commentary through a display device, such as display devices 508*a-c*. The users of the recipient media device can utilize the client program much like the users of the media devices generating the commentary. Additionally, user-generated commentary and media content can be generated at the recipient media device and can be transmitted to other devices in the system 500 that request the commentary and/or media content generated at the recipient media device.

In an embodiment, the server 510 can prompt a media device, such as media devices 502, 504, and 506, to set a range of the media content to be transmitted to the server 510. For example, the media device can set a range of the media content, which is thirty seconds before and thirty seconds after any commentary associated with the media content. The range can be defined by vertical start and end lines within the timeline of the media program that is presented by the client program, such as those surrounding comment 604 in FIG. 6. In another embodiment, the user of the media device can set the range without being prompted by the server 510. Moreover, the media device can temporally associate the user-generated comments with the media content according to timestamps associated with the requests. For example, if there is a timestamp at thirty seconds into a movie for a particular request, the media device can insert or otherwise associate the comment at that point in the movie.

In an embodiment, the server 510 and/or other devices of the system 500 can be configured to identify clusters of comments in a media program. A user of a media device, such as media device 502, can cause the media device to request an identification of clusters with the most frequent commentaries in a media program. The user can request to export one or more of the clusters that are identified by the server 510. Much like as described above, each cluster can be exported with a range of the media program starting before the first comment and ending some time after the last comment in the cluster. Referring again to FIG. 6, the server 510 can identify that there is a cluster of four comments 608 in the particular media program. The cluster of four comments 608 and a range of the media content associated with the four comments 608 can be sent to the media device requesting the identification of the cluster.

Figure 7:
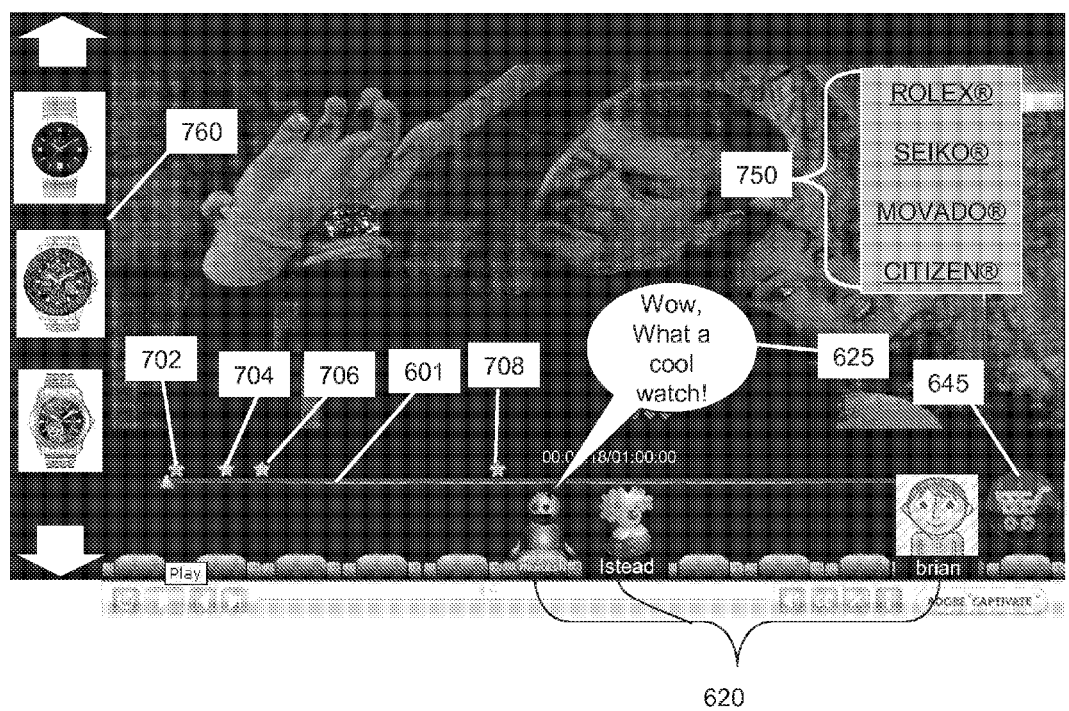

In an embodiment, as shown in FIG. 6 the symbolic overlay can include depictions, symbolic representations or iconic symbols 620 comprising one of an avatar representation of each user, a live webcam image of each user, a still picture of each user, or an animation of each user, or combinations thereof (note that FIG. 7 shows an animation for Lstead and a still picture/webcam image of Brian), wherein one or more temporal actions of the user are expressed by way of one of the avatar representations of each user, the live webcam image of each user, the still picture of each user, or the animation of each user, or combinations thereof. The gesture of the avatar corresponds to a motion of a body of the avatar, and the expression of the avatar comprises at least one of a plurality of expressions (see, for example, Mukesh having a happy face in FIG. 7).

The related U.S. patent application Ser. No. 12/146,131, mentioned above discloses a GUI which presents, for example, a virtual theater audience which represents at least a portion of a plurality of users, one or more of which can provide comments or commentary with respect to a media program or media content. As shown in FIG. 6, an embodiment consistent with the present invention provides a GUI in the form of an overlay generated by the client program and which presents a depiction of one or more of the users (such as but not limited to buddies in a buddy list) in, for example but not limited to, a virtual theater audience of the presentation of the symbolic overlay. Moreover, as will be explained in more detail below, one or more of the users can provide comments or commentary with respect to a media program or media content, and the comments or commentary are linked to consumer product searches or consumer services searches. For example, a user is watching a James Bond movie on a media device, such as media device 502 and display device 508*a*. During the movie, a scene occurs where James Bond is in a cave and has his hands bound with a rope in such a way that his watch is in view. The user may remark, such as by typing or keying in his comment on an input device, "Wow, what a cool watch!". Based on this commentary, the present invention contemplates conducting a product search for the watch. Moreover, the user's comment may cause the client program to bring up, for example, an image of the particular watch that James Bond is using, as well as search for and display any competitor watches that may be of interest to the user based on, for example, the style of watch. A more detailed explanation is set forth below.

As seen from the foregoing example, an embodiment consistent with the present invention uses the commentary initiated by one or more users while experiencing a media program in order to conduct searches for products and/or services associated with the media program. The searches for the products and/or services can be conducted based on a comparison of the commentary initiated by the one or more users to meta tags in a frame associated with the media program being commented on. The meta tags allow the user comments or commentary to be linked to the media program about which the user is commenting. With reference to FIG. 6, when the media program comprises a video, and the user-generated commentary (see callout 625 by Mukesh) is initiated regarding a particular consumer product or consumer service observed during the presentation of the media content, the client program included in server 510 (see FIG. 5), for example, brings up an enlarged image 640 of the particular consumer product or consumer service in the symbolic overlay. The client program can then advise a user to click on the image 640 of a product or service or to click on a link to the product or service, in order to either purchase the product or service and/or find out more information about the product or service. Moreover, the client program can automatically conduct the searches for products and/or services based on monitoring of the commentary initiated by one or more of the users. Alternatively, the user who is viewing the media program can manually conduct the searches for products and/or services based on the user dragging and dropping a particular commentary to one of a shopping cart or a search engine icon to invoke a search. FIG. 6 shows an example where the user using the mouse pointer 630 has dragged the comment 606 over the shopping cart 645 to invoke a search. Where the user manually conducts the search, the particular commentary may belong to either the user who is viewing the content, or to commentary from another user participating (for example, a buddy who is synchronously viewing the media program with the user and also commenting on the media program).

FIG. 7 depicts an embodiment of a presentation of the results for the searches for products and/or services associated with the media program in an area for advertisements in the symbolic overlay. In this example, the area for advertisements 750 comprises a vertical column. Alternatively, the area for advertisements may comprise a horizontal carrousel or a vertical carrousel 760. By carrousel, Applicants are referring to a format wherein the search results are arranged to rotate into view within, for example, a window provided as part of the symbolic overlay. FIG. 7 shows the user-generated comments along the timeline 601 represented as stars 702, 704, 706 and 708 rather than spheres as in FIG. 6.

Figure 8:
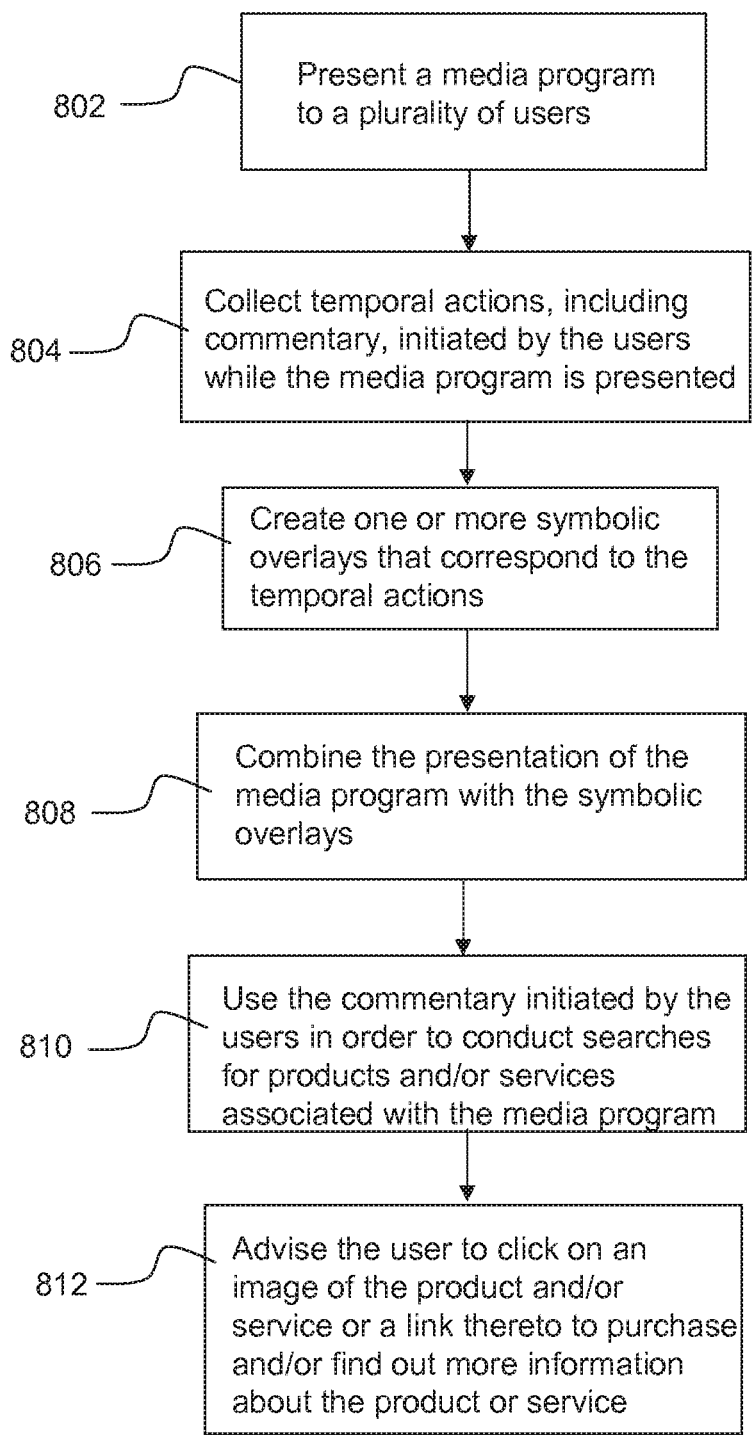
FIG. 8 depicts an illustrative embodiment of a method for transmitting media content operating in portions of the communication systems of FIGS. 1-2 and 5.

FIG. 8 depicts an illustrative embodiment of a method for transmitting media content operating in portions of the communication systems of FIGS. 1-2 and 5. For example, at step 802, each of a plurality of users is presented with a media program or media content. At step 804, the server 510, for example, collects one or more temporal actions, including commentary, initiated by the plurality of users while the media program is presented. At step 806, the client program included in the server 510 creates one or more symbolic overlays corresponding to the one or more temporal actions of each user. At step 808, the client program combines the presentation of the media program with a presentation of the one or more symbolic overlays. At step 810, the client program uses the commentary initiated by the users in order to conduct searches for the products and/or services associated with the media program. At step 812, the client program may advise at least one of the users to click on an image of a product or service or to click on a link to the product or service, in order to purchase the product or service and/or find out more information about the product or service.

Upon reviewing the aforementioned embodiments, it would be evident to an artisan with ordinary skill in the art that said embodiments can be modified, reduced, or enhanced without departing from the scope and spirit of the claims described below. For example, the media evaluation and overlay technique is not limited to video content such as movies, but can also be applied to audio-only content, video (with no audio) content, MTV programming, or the like. Moreover, while a product is shown as an example with respect to the search, services such as, but not limited to, insurance, auto repair, hair styling, etc., can be linked to user-commentary regarding media content being experienced by the user.

Other suitable modifications can be applied to the present disclosure without departing from the scope of the claims below. Accordingly, the reader is directed to the claims section for a fuller understanding of the breadth and scope of the present disclosure.

Figure 9:
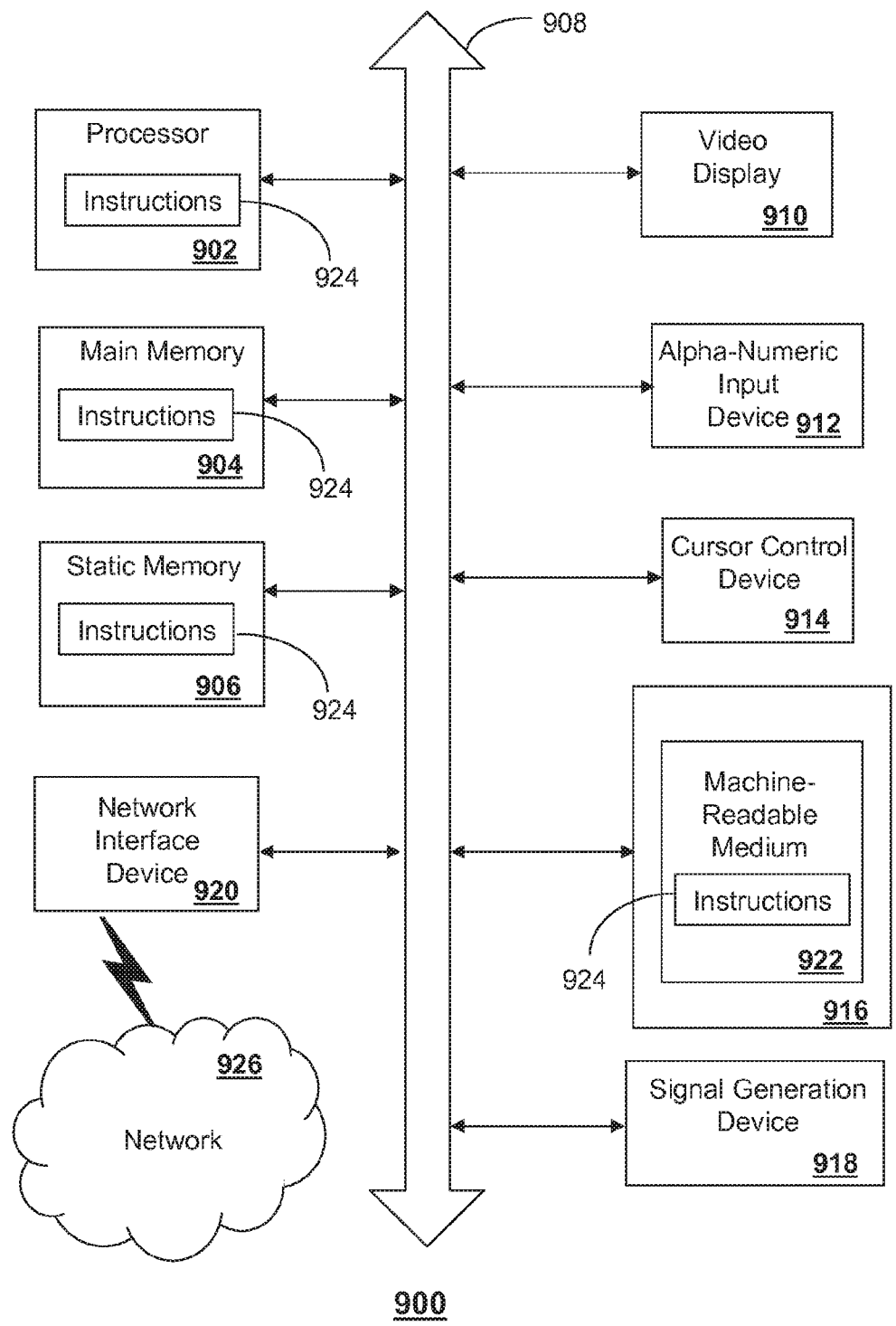
FIG. 9 is a diagrammatic representation of a machine in the form of a computer system within which a set of instructions, when executed, may cause the machine to perform any one or more of the methodologies discussed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. .sctn.1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
a processing system including a processor; and
a memory that stores executable instructions that, when executed by the processing system, facilitate performance of operations, comprising:
providing media content to a media device for a presentation on a display screen of a display device associated with a first user;

providing an overlay superimposed on the media content, the display screen accordingly having an overlaid area, the overlaid area comprising a graphical user interface;

receiving a cluster of commentaries in accordance with a frequency of occurrence of the commentaries during the presentation of the media content, wherein at least one of the cluster of commentaries is received from a mobile device associated with a second user;

exporting the cluster of commentaries and a portion of the media content associated with the cluster, in response to a request from the media device wherein the cluster of commentaries are presented on the display screen of the display device coupled to the media device;

identifying an item in a commentary from the cluster of commentaries resulting in an identified item;

providing a first graphical representation of the commentary associated with the identified item on the display screen;

presenting a second graphical representation of a shopping cart on the display screen;

conducting a search for a plurality of similar items from competitors using an internet search engine based on the identified item associated with the media content in response to user-generated input causing a dragging of the first graphical representation to the second graphical representation on the display screen; and providing results of the search and the identifier item for display in the overlaid area.

2. The system of claim 1, wherein the item is shown in a scene during the presentation of the media content, wherein the overlay comprises a timeline associated with the presentation of the media content and a plurality of icons positioned along the timeline, wherein each commentary from the cluster is authored by a commentator and an icon from the plurality of icons is associated with each commentary and each commentator.

3. The system of claim 2, wherein the icon comprises an avatar representation of the associated commentator, a webcam image of the associated commentator, a still image of the associated commentator, or an animated representation of the associated commentator.

4. The system of claim 2, wherein the media content is presented at a plurality of media devices, and wherein each commentator corresponds to a user of each of the media devices.

5. The system of claim 1, wherein the search is based on a comparison of content in the cluster of commentaries to meta tags in a frame associated with the media content.

6. The system of claim 1, wherein the media content comprises video content, and wherein the operations further comprise presenting an option to the media device to select an item image to receive additional information relating to the item.

7. The system of claim 1, wherein the item is one of a product or a service.

8. The system of claim 1, wherein the operations further comprise receiving an input from the media device to invoke the search.

9. The system of claim 1, wherein a meta tag associated with the commentary links the commentary to the media content.

10. A non-transitory machine-readable storage medium, comprising executable instructions that, when executed by a processing system including a processor, facilitate performance of operations, comprising:

providing media content at a media device, wherein the media device delivers the media content to a display device having a display screen, wherein the display device is associated with a first user;

presenting a symbolic overlay superimposed on the media content displayed on the display screen, the display screen accordingly having an overlaid area;

receiving a plurality of commentaries, from a plurality of media devices, in accordance with a frequency of occurrence of the plurality of commentaries during a presentation of the media content, the plurality of media devices including the media device, wherein at least one of the plurality of commentaries is received from a mobile device associated with a second user, wherein the mobile device presents the media content;

providing the plurality of commentaries and a portion of the media content, in response to a request from the media device wherein the plurality of commentaries are presented on the display screen of the display device coupled to the media device;

identifying a commentary from the plurality of commentaries;

matching an item associated with the commentary to an image of the item in the portion of media content resulting in a matched item;

providing a first graphical representation of the commentary associated with the matched item on the display screen;

presenting a second graphical representation on the display screen;

conducting a search for a plurality of similar items from competitors using an internet search engine based on the matched item associated with the media content in response to user-generated input causing a dragging of the first graphical representation to the second graphical representation on the display screen; and providing results of the search and the matched item for display in the symbolic overlay.

11. The non-transitory machine-readable storage medium of claim 10, wherein the operations further comprise highlighting an image of the item in the overlaid area, wherein the symbolic overlay comprises a graphical user interface, and wherein the symbolic overlay further comprises a timeline associated with the presentation of the media content and a plurality of icons positioned along the timeline, wherein each commentary from the plurality of commentaries is authored by a commentator and an icon from the plurality of icons is associated with each commentary and each commentator.

12. The non-transitory machine-readable storage medium of claim 11, wherein the icon comprises an avatar representation of the associated commentator, a webcam image of the associated commentator, a still image of the associated commentator, or an animated representation of the associated commentator.

13. The non-transitory machine-readable storage medium of claim 10, wherein the media content is presented at a plurality of media devices, and wherein each commentator corresponds to a user of each of the media devices.

14. The non-transitory machine-readable storage medium of claim 10, wherein the operations further comprise receiving an input from the media device to invoke the search.

15. The non-transitory machine-readable storage medium of claim 10, wherein the item is one of a product or a service.

16. A method comprising:
presenting, by a processing system comprising a processor, media content at a media device, wherein the media device delivers the media content for display on a display screen of a display device associated with a first user;
presenting, by the processing system, a symbolic overlay superimposed on the media content;
requesting a commentary from a mobile device associated with a second user;
receiving, by the processing system, a plurality of commentaries, from a plurality of media devices, in accordance with a frequency of occurrence of the commentaries during the presentation of the media content, wherein at least one of the plurality of commentaries is the commentary from the mobile device associated with the second user;
presenting, by the processing system, the plurality of commentaries and a portion of the media content, in response to a request from the media device wherein the plurality of commentaries are presented in the symbolic overlay on the display screen of the display device coupled to the media device;
identifying an item in the commentary from the plurality of commentaries resulting in an identified item;
providing a first graphical representation of the commentary associated with the identified item on the display screen;
presenting a second graphical representation on the display screen;
conducting, by the processing system, a search for a plurality of similar items from competitors using an internet search engine based on the identified item associated with the media content in response to user-generated input causing a dragging of the first graphical representation to the first graphical representation on the display screen; and
providing, by the processing system, results of the search and the identified item for display in the symbolic overlay.

17. The method of claim 16, further comprising highlighting an image of the item in the symbolic overlay, wherein the symbolic overlay comprises a timeline associated with the presentation of the media content and a plurality of icons positioned along the timeline, wherein each commentary from the plurality of commentaries is authored by a commentator and an icon from the plurality of icons is associated with each commentary and each commentator.

18. The method of claim 17, wherein the icon comprises an avatar representation of the associated commentator, a webcam image of the associated commentator, a still image of the associated commentator, or an animated representation of the associated commentator.

19. The method of claim 16, wherein the item is one of a product or a service.

20. The method of claim 16, wherein the plurality of items include a first item based on the item associated with the media content and a second item that is of a similar type as the first item and has a brand other than an item brand of the first item.

* * * * *